US012614884B2

(12) United States Patent     (10) Patent No.:   US 12,614,884 B2
Bauer     (45) Date of Patent:    Apr. 28, 2026

(54) BUSBAR DEVICE AND INTERMEDIATE CIRCUIT CAPACITOR APPARATUS HAVING A SNUBBER ACTION, AND MOTOR VEHICLE

(71) Applicant: Bayerische Motoren Werke Aktiengesellschaft, Munich (DE)

(72) Inventor: Nikolas Bauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 225 days.

(21) Appl. No.: 18/682,263

(22) PCT Filed: Sep. 27, 2022

(86) PCT No.: PCT/EP2022/076828
§ 371 (c)(1),
(2) Date: Feb. 8, 2024

(87) PCT Pub. No.: WO2023/066621
PCT Pub. Date: Apr. 27, 2023

(65) Prior Publication Data
US 2025/0132533 A1    Apr. 24, 2025

(30) Foreign Application Priority Data

Oct. 21, 2021   (DE) ..................... 10 2021 127 369.2

(51) Int. Cl.
*H01R 25/16*      (2006.01)
*H01G 4/38*      (2006.01)
*H02M 1/34*      (2007.01)
(52) U.S. Cl.
CPC ............. *H01R 25/165* (2013.01); *H01G 4/38* (2013.01); *H01R 25/161* (2013.01); *H02M 1/34* (2013.01)

(58) Field of Classification Search
CPC ...... H01R 25/165; H01R 25/161; H01G 4/38; H01G 4/228; H01G 4/32; H01G 2/04; H01G 2/06; H02M 1/34; H05K 7/14329
See application file for complete search history.

(56) References Cited

U.S. PATENT DOCUMENTS 5,132,896 A    7/1992   Nishizawa et al.
2010/0132193 A1*   6/2010   Yoshinaga ............... H01G 4/38
                                   29/874

(Continued)

FOREIGN PATENT DOCUMENTS

CN      102969908 A    3/2013
DE      41 10 339 A    10/1991

(Continued)

OTHER PUBLICATIONS

Korean-language Office Action issued in Korean Application No. 10-2024-7001102 dated Nov. 21, 2024 with English Translation (9 pages).

(Continued)

*Primary Examiner* — Thienvu V Tran
*Assistant Examiner* — Lauren Ashley Shaw
(74) *Attorney, Agent, or Firm* — Crowell & Moring LLP

(57)           ABSTRACT

A busbar device, a corresponding intermediate circuit capacitor apparatus and a motor vehicle equipped therewith are provided. The busbar device has electrical contact elements, each forming a contact surface region in which they extend parallel to one another in a planar manner. On at least one end thereof each of the contact elements has a connection region as an outer connection. The contact elements form a snubber capacitor. For this purpose the contact surface regions are spaced apart from one another, perpendicularly to their main extension plane, only by an electrical insulation layer. Moreover, the contact surface regions extend, in the directions which span their main extension (Continued)

plane, over the majority of a total extent of the busbar device. The height of the busbar device perpendicularly to the main extension plane of the contact surface regions is less than the extent thereof in this main extension plane.

14 Claims, 1 Drawing Sheet

(56) References Cited

U.S. PATENT DOCUMENTS

| | | | |
|---|---|---|---|
| 2011/0149472 A1* | 6/2011 | Yang | H01G 4/38 |
| | | | 29/25.41 |
| 2013/0033913 A1 | 2/2013 | Sparka | |
| 2013/0094122 A1* | 4/2013 | Domes | H05K 7/14329 |
| | | | 361/321.1 |
| 2017/0055366 A1* | 2/2017 | Backhaus | H05K 7/20 |
| 2019/0222133 A1 | 7/2019 | Matlok | |
| 2020/0328032 A1 | 10/2020 | Gomez et al. | |
| 2022/0293341 A1 | 9/2022 | Westermann | |

FOREIGN PATENT DOCUMENTS

| | | |
|---|---|---|
| DE | 10 2009 055 376 A1 | 6/2011 |
| DE | 10 2015 115 145 A1 | 3/2017 |
| DE | 10 2018 103 166 A1 | 6/2019 |
| DE | 10 2019 217 976 A1 | 3/2021 |
| EP | 2 234 129 A2 | 9/2010 |
| EP | 3 512 085 A1 | 7/2019 |
| JP | 2003-319665 A | 11/2003 |
| JP | 2008-130641 A | 6/2008 |
| JP | 4346504 B2 | 10/2009 |
| WO | WO 2017/051639 A1 | 3/2017 |

OTHER PUBLICATIONS

International Search Report (PCT/ISA/210) issued in PCT Application No. PCT/EP2022/076828 dated Jan. 18, 2023, with English translation (5 pages).

German-language Written Opinion (PCT/ISA/237) issued in PCT Application No. PCT/EP2022/076828 dated Jan. 18, 2023, with English translation (10 pages).

German-language Search Report issued in German Application No. 10 2021 127 369.2 dated Jun. 29, 2022, with partial English translation (12 pages).

* cited by examiner

BUSBAR DEVICE AND INTERMEDIATE CIRCUIT CAPACITOR APPARATUS HAVING A SNUBBER ACTION, AND MOTOR VEHICLE

BACKGROUND AND SUMMARY

The present invention relates to a busbar device for a capacitor apparatus of an electrical intermediate circuit, to a corresponding intermediate circuit capacitor apparatus, and to a motor vehicle equipped with an intermediate circuit capacitor apparatus.

An electrical intermediate circuit is used in many cases as an energy store for electrically coupling a plurality of electrical networks or subnetworks at an interposed current or voltage level via converters. Various challenges may be faced here, for example, in respect of electromagnetic compatibility (EMC), occurrence of overshoots and oscillations during switching processes and the like. Problems of this kind were previously able to be countered by correspondingly complicated shielding, correspondingly load-bearing or voltage-proof designs and/or upstream snubbers. However, this may disadvantageously result in additional weight, an additional installation space requirement and additional costs.

Against this background, EP 3 512 085 A1, for example, describes a DC-DC converter with parasitic resonant circuits and ultra-steep switching flanks. Specifically, the document describes an apparatus having a DC-DC converter with a semiconductor switch and a current source, the DC-DC converter having a commutation resonant circuit, which is determined by parasitic properties of the DC-DC converter. A driving device is also provided in order to switch the semiconductor switch by performing a switching process. The driving device is configured to perform the switching process with a switching duration that is shorter than a period duration of a resonant frequency of the commutation resonant circuit. In addition, the driving device is designed to select a time for the switching process such that a current provided by the current source generates an overshoot at the semiconductor switch of at most 30% with respect to an idle state of the semiconductor switch. As a result, low losses and overvoltages should be possible in the DC-DC converter.

As a further approach, DE 10 2015 115 145 A1 describes a power converter arrangement which is intended to have a comparatively high integration density, the expenditure on assembly of which is intended to be reduced, and which is intended to be less susceptible to faults and/or have reduced parasitic effects. For this purpose, the power converter arrangement described in the document has a semiconductor module, an electrical capacitor and a heat sink with a pin or fin cooling structure. The electrical capacitor is directly fastened to the heat sink here.

An object of the present invention is to specify a particularly efficient way of implementing a power-electrical system having an intermediate circuit.

According to the invention, this object is achieved by the subjects of the independent claims. Possible refinements and developments of the present invention are disclosed in the dependent claims, in the description and in the figures.

The busbar device according to the invention is intended or designed for an intermediate circuit capacitor apparatus. In other words, the busbar device can electrically connect or contact a plurality of individual capacitors or windings, which can be used in combination as an intermediate circuit capacitor. The busbar device according to the invention has a first electrical contact element and a second electrical contact element. These contact elements can also be referred to as a positive contact element and a negative contact element, that is to say are used for the two electrical polarities. The contact elements each form a contact surface region, in which they extend parallel to one another in a planar manner. These contact surface regions are used as electrical connection or contact points for the plurality of capacitors of the intermediate circuit capacitor apparatus. The capacitors may be, in particular, winding capacitors, that is to say capacitors with a winding or foil winding as the capacitor cell. These capacitors or windings can then therefore be electrically connected to the contact elements in their contact surface regions in order to construct the intermediate circuit capacitor apparatus. The contact elements further each have, at at least one end, possibly at two, in particular mutually opposite, ends, of the contact surface region, a respective adjoining connection region as an outer connection. These connection regions or outer connections can therefore be used or function as connections or contacts to external components or elements, for example, to electrical subnetworks coupled to each other by the intermediate circuit capacitor apparatus, an AC and/or a DC side of the intermediate circuit or an apparatus comprising these, or the like. The connection regions can be designed or formed in one piece, that is to say integrally or monolithically, with the respective contact surface region or can be connected to it in some other way.

According to the invention, provision is made for the contact elements to form a snubber or snubber capacitor. However, here, this does not mean an RC element since a corresponding R, that is to say resistor component, is produced here by dielectric loss factors in an electrical insulation or insulating film between the contact elements and owing to skin and proximity effects in the current-carrying components of the busbar device. The snubber capacitor can also be referred to as a high-frequency X capacitor here. The present invention or the snubber capacitor provided or designed according to the invention can therefore be regarded to be an RF expansion of an effective X capacitance. However, the likewise electrically contacted winding can have a capacitive effect only at relatively low frequencies. The busbar device can therefore be used or function as a damping element for damping undesired oscillations, for example, during switching processes in a respective electrical network or a respective commutation cell or the like. To date, resonances which are determined by an inherent inductance, for example, of the respective busbar or a respective commutation cell, have often been present in previous electrical barring or busbar arrangements of intermediate circuit capacitor apparatuses. As a result, voltage overshoots and oscillations with relatively large amplitudes and relatively slow decay behavior or transient response can be produced, which are ultimately undesired. This can advantageously be reduced by the busbar device according to the invention or the design or configuration of the busbar device to maximize its capacitance.

For this purpose, according to the invention, the contact surface regions are spaced apart from each other perpendicularly to their main extension plane only by an electrical insulation layer or high-voltage insulation arranged between the contact elements or their contact surface regions. In this case, this insulation layer can be, in particular, thinner than the two contact elements in their contact surface regions. In other words, the contact surface regions of the contact elements are therefore arranged as closely or tightly as possible while at the same time complying with the electrical insulation requirements and specified manufacturing tolerances.

The main extension plane of the contact surface regions can be, in particular, the main extension planes of that region of the busbar device in which the capacitors are arranged or connected in the intended installation position, that is to say are electrically contacted by the busbar device or the contact elements. The contact elements can therefore have other regions that can extend in other planes, for example, partially or at least substantially perpendicularly to the contact surface regions or their main extension plane.

According to the invention, provision is further made for the contact surface regions to extend in the directions spanning their main extension plane over at least a majority of a total extent or total size of the busbar device—or possibly also the entire corresponding intermediate circuit capacitor apparatus. In other words, a surface extent of the contact surface regions is therefore maximized—possibly taking into consideration specified requirements or restrictions, for example, in respect of an installation space required overall, in particular an installation space required for the plurality of capacitors of the corresponding intermediate circuit capacitor apparatus, a prespecified weight or cost limit and/or the like. Both the minimization of the distance between the contact elements or the contact surface regions, provided according to the invention, in the direction perpendicular to their main extension plane and the configuration of the contact elements or the contact surface regions as flat, that is to say plate-like or plate-shaped, regions with a maximized surface area leads to maximization of the electrical capacitance of the busbar device.

According to the invention, provision is further made for a height, that is to say a total or maximum extent, of the busbar device perpendicular to the main extension plane of the contact surface regions to be less than an extent or size of the contact surface regions or the busbar device overall in the main extension plane of the contact surface regions, that is to say in one or both of the directions spanning this main extension plane. In other words, the height of the busbar device can therefore be less than a length and/or width of the entire busbar device or the contact surface regions in their main extension plane. The busbar device is therefore designed or shaped to be as coplanar or flat as possible. This can lead to a reduced or minimized inductance of the busbar device.

The configuration of the busbar device provided according to the present invention is based on the knowledge that, owing to this configuration, increased capacitance and reduced inductance in comparison to conventional busbars can be achieved and thus the busbar device according to the invention can be used or function as a snubber or high-frequency snubber (HF snubber). Therefore, a synergistic effect or a synergistic, that is to say multifunctional, use of the busbar device both for electrically contacting the plurality of capacitors of the corresponding intermediate circuit capacitor apparatus and also as a snubber can be achieved without significant disadvantages. Similarly, owing to the configuration of the contact elements or the contact surface regions with a particularly large surface area, their material thicknesses can be reduced without increasing the electrical resistance. Therefore, overall, improved EMC behavior can be achieved, voltage overshoots and electrical oscillations can be reduced and expensive and complicated filtering measures can be saved or made more simple. Therefore, improved, more compact and more cost-effective implementation of intermediate circuits or electrical devices or circuits equipped therewith can be achieved overall.

In one possible configuration of the present invention, the insulation layer has a thickness, that is to say a material or layer thickness, of at most 500 µm perpendicular to the main extension plane of the contact surface regions. This renders possible effective electrical insulation of the two contact elements from each other, even taking into consideration typical manufacturing tolerances. At the same time, a particularly high capacitance of the busbar device and thus a particularly strong and effective action as a snubber can be achieved in this way. In this case, the thickness of the insulation layer may be, for example, at least 100 µm in order to ensure reliable electrical insulation.

In a further possible configuration of the present invention, the insulation layer has a relative permittivity of $\varepsilon_r \gg 1$. In other words, the insulation layer is thus manufactured or formed from a highly permittive material. For example, the relative permittivity $\varepsilon_r$ of the insulation layer may be at least 3.9 or at least 6, at least 10 or more. A configuration of this kind of the insulation layer can likewise contribute to maximizing the capacitance of the busbar device and thus further increase its action as a snubber.

In a further possible configuration of the present invention, the contact surface region, which faces the capacitors of the intermediate circuit capacitor apparatus in the intended installation position and here may also be referred to as the upper contact surface region or as the contact surface region of the upper contact element, has at least one recess or leadthrough to the other contact surface region. In particular, depending on the capacitor or winding provided as intended, one, in particular precisely one, such recess or leadthrough can be provided or formed in the upper contact surface region. The respective capacitor can be arranged in the leadthrough or a corresponding electrical connection can be guided through the leadthrough in order to electrically connect the respective capacitor or winding to the other, that is to say lower, contact surface region or contact element. The configuration proposed here can render possible particularly simple and compact, that is to say installation space-saving, configuration or implementation of the intermediate circuit capacitor apparatus. Therefore, for example, electrical connection lines for the capacitors can be saved or shortened.

In a further possible configuration of the present invention, the connection regions arranged at the or one end or on one side of the contact surface regions are configured to be the same at least apart from a height difference in the direction perpendicular to the main extension plane of the contact surface regions that corresponds to the distance between the contact surface regions perpendicular to their main extension plane. The connection regions may therefore have the same shape and size or else the same orientation, apart from this distance or height difference. These connection regions may be, in particular, the connection regions of the or a DC side, that is to say the connection regions for a direct-current or DC-voltage connection of the busbar device or the contact elements. Owing to the configuration, proposed here, of the connection regions, a size or surface area of the busbar device in one or both of the planes perpendicular to the main extension plane of the contact surface regions or a corresponding projection plane can be reduced or kept particularly small compared to conventional busbars. This may lead or contribute to a reduced or particularly low inductance of the busbar device and thus ultimately to a particularly small ESL (Equivalent Series Inductivity) of the corresponding intermediate circuit capacitor apparatus and thus assist the action or function of the busbar device as a snubber. In particular, the connection regions can have subregions arranged parallel to the contact surface regions but spaced apart from them perpendicularly to their main extension plane. These subregions of the various connection regions can then be arranged in the same plane, that is to say at the same distance, measured perpendicularly to the main extension plane of the contact surface regions, from one of the contact surface regions. As an alternative, these subregions can be arranged one above the other or one behind the other, that is to say in a manner overlapping or covering one another, as seen perpendicularly to the main extension plane of the contact surface regions.

In a further possible configuration of the present invention, the busbar device has a connection inductance, that is to say an ESL, of less than 1 nH. In particular, the connection inductance or ESL may be much lower than 1 nH. In addition, for example, a surface area or size of the busbar device may be correspondingly limited in at least one plane or projection plane perpendicular to the main extension plane of the contact surface regions. The configuration proposed here can therefore specify or indicate a corresponding design, shape or construction limit for the busbar device. Owing to the configuration, proposed here, of the busbar device, the busbar device can be used effectively and practically as a snubber in practical applications, for example in a commutation cell of an inverter for a traction battery of a motor vehicle or the like and there possibly allow an additional snubber capacitor to be dispensed with and/or allow a significant reduction in a dielectric strength of components or elements used.

A further aspect of the present invention is an intermediate circuit capacitor apparatus, which has a busbar device according to the invention and a plurality of capacitors, in particular winding capacitors, electrically connected or contacted by means of the busbar device. The intermediate circuit capacitor apparatus according to the invention may be, in particular, the intermediate circuit capacitor apparatus mentioned in connection with the busbar device according to the invention, or correspond to this intermediate circuit capacitor apparatus. Accordingly, the intermediate circuit capacitor apparatus according to the invention may have some or all of the properties and/or features mentioned in this context.

In one possible development of the present invention, the capacitors are configured as winding capacitors. These winding capacitors are then arranged on the contact surface regions in such a way that their winding axes are perpendicular to the main extension plane of the contact surface regions. The winding axis of a winding capacitor in the present sense is that axis around which the winding is wound. The winding axis can therefore correspond to a cylinder center longitudinal axis of the respective capacitor. Here, the plurality of capacitors are therefore arranged vertically parallel to one another or with parallel-oriented winding axes next to one another on the contact surface regions. This can render possible particularly compact, that is to say installation space-saving, configuration of the intermediate circuit capacitor apparatus together with a particularly large surface area of the contact surface regions. Therefore, in addition, particularly simple and short electrical connection or contacting of the capacitors can be rendered possible. The capacitors can each have a cylindrical shape and be arranged in a regular arrangement or a regular pattern, in particular with extremely dense packing, that is to say in rows respectively offset by half a cylinder diameter in relation to one another.

In a further possible configuration of the present invention, the capacitors are arranged in a compact grouping. The size of the contact surface regions in their main extension plane then corresponds substantially to the size of this grouping of capacitors in the directions spanning the main extension plane of the contact surface regions. In other words, the size or extent of the contact surface regions in their main extension plane is therefore limited by or restricted to the size or extent of the grouping of capacitors. In this way, the size or the installation space requirement of the intermediate circuit capacitor apparatus can be reduced or restricted to the minimum size required by the capacitors provided or the minimum installation space required for the capacitors provided. For example, a housing of the intermediate circuit capacitor apparatus, in which the capacitors or else the busbar device are/is arranged or accommodated, can thus be configured in a particularly compact manner. A particularly good compromise between minimizing an installation space requirement, a weight and the manufacturing costs of the intermediate circuit capacitor apparatus on the one hand and maximizing the capacitance or snubber action of the busbar device on the other hand can thus be implemented. The fact that the contact surface regions correspond substantially to the corresponding size or extent of the grouping of capacitors may, for example, mean that the contact surface areas project beyond the grouping of capacitors in one, in particular in only or precisely one, direction or dimension to form or connect the connection regions, in particular only to the minimum extent required for this purpose. In the other, that is to say perpendicular, direction or dimension of the main extension plane of the contact surface regions, the contact surface regions can in contrast extend, for example, only or precisely as far as an outer side or outer wall of the grouping of capacitors.

A further aspect of the present invention is a motor vehicle which has a traction battery and an intermediate circuit capacitor apparatus according to the invention electrically connected to the traction battery. The motor vehicle according to the invention may be, in particular, the motor vehicle mentioned in connection with the other aspects of the present invention or correspond to this motor vehicle and thus have some or all of the properties and/or features mentioned in the other aspects.

Further features of the invention can be gathered from the claims, the figures and the description of the figures. The features and combinations of features cited in the description above and the features and combinations of features shown in the description of the figures below and/or in the figures alone may be used not only in the particular indicated combination but also in other combinations or on their own, without departing from the scope of the invention.

DETAILED DESCRIPTION OF THE DRAWINGS

Figures 1, 2:
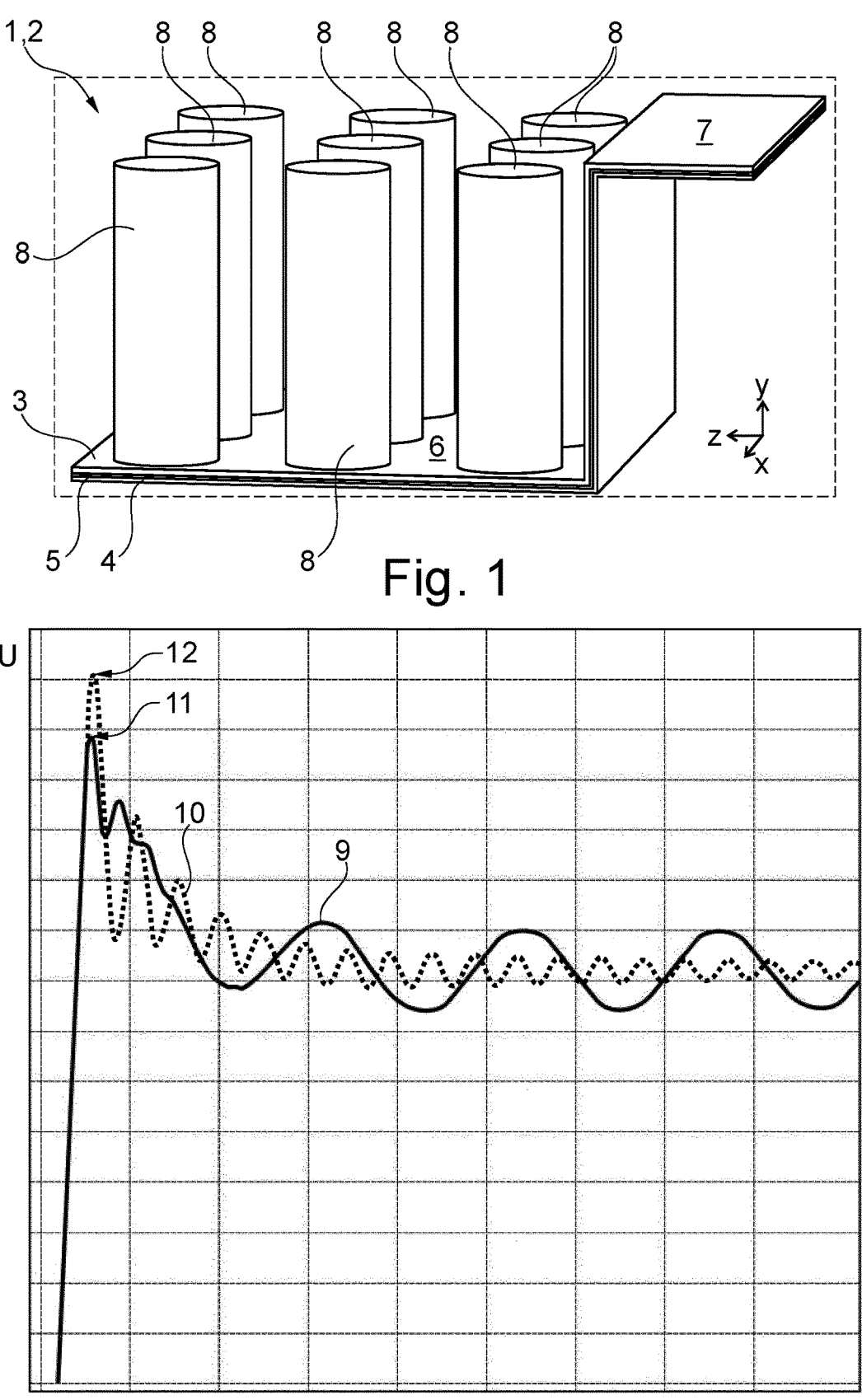
FIG. 1 shows a schematic perspective view of a detail of a busbar device for an intermediate circuit capacitor apparatus.
FIG. 2 shows a schematic illustration of a graph for illustrating a snubber function of the busbar device in comparison to a conventional busbar device.

FIG. 1 shows a schematic perspective illustration of a detail of an intermediate circuit capacitor apparatus 1 having a busbar device 2. The busbar device 2 has a first contact element 3, a second contact element 4 and an insulation layer 5 arranged between them. The contact elements 3, 4 are therefore electrically conductive, while the insulation layer 5 is electrically nonconductive, in particular is manufactured entirely or partially from a highly permittive dielectric.

The contact elements 3, 4 each have a contact surface region 6 in which they extend parallel to one another in a planar manner, that is to say are configured in a plate-shaped manner. The contact elements 3, 4 further have a respective connection region 7 at least one end-here at only one end by way of example—or on at least one side. A further connection region can be formed at the opposite end or the opposite side of the contact elements 3, 4 or the contact surface regions 6.

A coordinate system with spatial directions x, y, z is schematically indicated for illustration purposes or as a reference.

Therefore, here, the contact surface regions 6 extend in a planar manner in the x-z plane or maximized in respect of their size or extent. Perpendicular to this, that is to say in the x-y plane or in the y-z plane, the busbar device 2 can, however, have or cover, in particular, a comparatively smaller surface area.

Owing to the configuration, proposed here, of the busbar device 2, the busbar device can have a particularly low ESL together with a particularly high capacitance $C_{bar}$, where $C_{bar} = \varepsilon_0 \cdot \varepsilon_r \cdot A/d$. Here, $\varepsilon_0$ indicates the electrical field constant, $\varepsilon_r$ indicates the relative permittivity of the insulation layer 5, A indicates the surface area over which the contact elements 3, 4 are arranged locally parallel to each other in a manner separated by the insulation layer 5, that is to say in particular or including the surface area of the contact surface regions 6 in the x-z plane, and d indicates the distance between the contact surface regions 6 in the y-direction, that is to say the thickness of the insulation layer 5.

The busbar device 2 therefore functions as a high-frequency X capacitor here, that is to say as an HF snubber for damping oscillations and for reducing voltage overshoots or peaks.

The intermediate circuit capacitor apparatus 1 also comprises a plurality of capacitors 8, likewise schematically indicated here. These capacitors are arranged vertically on the contact surface regions 6 and can together form or provide an intermediate circuit capacitance. In contrast to the manner schematically illustrated here, the capacitors 8 can be arranged in particular in a more tightly packed manner for practical implementation of the intermediate circuit capacitor apparatus 1. The contact surface regions 6 can in particular be dimensioned such that they cover at least substantially the entire surface area required by the capacitors 8 in the x-z plane, but project beyond capacitors 8 therein only to the structurally necessary extent.

To further illustrate the damping or snubber effect of the busbar device 2, FIG. 2 shows, by way of example and schematically, a graphical illustration in which two curves of an intermediate circuit voltage U are plotted with respect to time t. Specifically, a transient curve 9 produced with the busbar device 2 and a reference curve 10 are illustrated for a switching process here. The reference curve 10 may be produced when using a conventional busbar instead of the busbar device 2 in an otherwise identical intermediate circuit or an otherwise identical intermediate circuit capacitor apparatus 1. It can be clearly seen here that, on account of the configuration of the busbar device 2 and the snubber action caused or achieved as a result, the transient curve 9 has a voltage peak 11 which is considerably lower than a corresponding reference voltage peak 12, that is to say a maximum, of the reference curve 10. In addition, the transient curve 9 exhibits a significantly lower oscillation frequency than the reference curve 10. This illustrates that the busbar device 2, owing to its configuration for implementing a parasitic capacitor, can reduce voltage overshoots and, in particular high-frequency, oscillations during operation of the intermediate circuit capacitor apparatus 1 or an electrical system comprising it, without additional elements being required for this purpose.

Overall, the described examples therefore show how an HF snubber but for an intermediate circuit capacitor can be implemented in a simple and efficient manner.

| List of reference signs | |
|---|---|
| 1 | Intermediate circuit capacitor apparatus |
| 2 | Busbar device |
| 3 | First contact element |
| 4 | Second contact element |
| 5 | Insulation layer |
| 6 | Contact surface region |
| 7 | Connection region |
| 8 | Capacitor |
| 9 | Transient curve |
| 10 | Reference curve |
| 11 | Voltage peak |
| 12 | Reference voltage peak |
| U | Intermediate circuit voltage |
| t | Time |
| x, y, z | Spatial directions |

What is claimed is:

1. A busbar device for an intermediate circuit capacitor apparatus, the busbar device comprising:
   a first contact element and a second contact element which each form a contact surface region, in which the first contact element and the second contact element extend parallel to one another in a planar manner, as a connection surface for a plurality of capacitors and each have, at at least one end of the contact surface region, a respective adjoining connection region as an outer connection, wherein the contact elements form a snubber capacitor;
   wherein the contact surface regions are spaced apart from each other perpendicularly to a main extension plane of the contact surface regions only by an electrical insulation layer,
   wherein the contact surface regions extend in directions spanning the main extension plane over a majority of a total extent of the busbar device,
   wherein a height of the busbar device perpendicular to the main extension plane of the contact surface regions is less than a length and/or width of the contact surface regions extending in the main extension plane, and
   wherein the busbar device has a connection inductance of less than 1 nH.

2. The busbar device according to claim 1, wherein one of the contact surface regions which faces the capacitors in the intended installation position, has at least one recess for each capacitor as a leadthrough to another one of the contact surface regions.

3. The busbar device according to claim 1, wherein the connection regions arranged at one end of the contact surface regions are configured to be the same shape and size or orientation, at least apart from a height difference that corresponds to the distance between the contact surface regions perpendicular to their main extension plane.

4. The busbar device according to claim 1, wherein the insulation layer has a thickness of at most 500 μm.

5. The busbar device according to claim 4, wherein the insulation layer has a relative permittivity of $\varepsilon_r \gg 1$.

6. The busbar device according to claim 4, wherein one of the contact surface regions, which faces the capacitors in the intended installation position, has at least one recess for each capacitor as a leadthrough to another one of the contact surface regions.

7. The busbar device according to claim 4, wherein the connection regions arranged at one end of the contact surface regions are configured to be the same shape and size or orientation, at least apart from a height difference that corresponds to the distance between the contact surface regions perpendicular to their main extension plane.

8. The busbar device according to claim 1, wherein the insulation layer has a relative permittivity of $\varepsilon_r \gg 1$.

9. The busbar device according to claim 8, wherein one of the contact surface regions, which faces the capacitors in the intended installation position, has at least one recess for each capacitor as a leadthrough to another one of the contact surface regions.

10. The busbar device according to claim 8, wherein the connection regions arranged at one end of the contact surface regions are configured to be the same shape and size or orientation, at least apart from a height difference that corresponds to the distance between the contact surface regions perpendicular to their main extension plane.

11. An intermediate circuit capacitor apparatus, having a busbar device according to claim 1 and a plurality of capacitors which are electrically connected by way of the busbar device.

12. The intermediate circuit capacitor apparatus according to claim 11, wherein the capacitors are arranged in a compact grouping and the size of the contact surface regions correspond substantially to the corresponding size of the grouping of capacitors in respect of the main extension plane of the contact surface regions.

13. An intermediate circuit capacitor apparatus comprising:

a busbar device for an intermediate circuit capacitor apparatus, wherein the busbar device includes:

a first contact element and a second contact element which each form a contact surface region, in which the first contact element and the second contact element extend parallel to one another in a planar manner, as a connection surface for a plurality of capacitors and each have, at at least one end of the contact surface region, a respective adjoining connection region as an outer connection, wherein the contact elements form a snubber capacitor;

wherein the contact surface regions are spaced apart from each other perpendicularly to a main extension plane of the contact surface regions only by an electrical insulation layer, wherein the contact surface regions extend in directions spanning the main extension plane over a majority of a total extent of the busbar device, wherein a height of the busbar device perpendicular to the main extension plane of the contact surface regions is less than a length and/or width of the contact surface regions extending in the main extension plane; and a plurality of capacitors which are electrically connected by way of the busbar device, wherein the capacitors are configured as winding capacitors and are arranged on the contact surface regions in such a way that their winding axes are perpendicular to the main extension plane of the contact surface regions.

14. The intermediate circuit capacitor apparatus according to claim 13, wherein the capacitors are arranged in a compact grouping and the size of the contact surface regions correspond substantially to the corresponding size of the grouping of capacitors in respect of the main extension plane of the contact surface regions.

\* \* \* \* \*